United States Patent

Abe

[11] Patent Number: 5,356,089
[45] Date of Patent: Oct. 18, 1994

[54] REEL LOCK FOR VIDEO CASSETTE

[75] Inventor: Akira Abe, Miyagi, Japan

[73] Assignee: Sony Corporation, Tokyo, Japan

[21] Appl. No.: 794,328

[22] Filed: Nov. 12, 1991

Related U.S. Application Data

[63] Continuation of Ser. No. 545,574, Jun. 29, 1990, abandoned.

[30] Foreign Application Priority Data

Jul. 4, 1989 [JP] Japan ................ 1-172487

[51] Int. Cl.$^5$ ........................................... G11B 23/087
[52] U.S. Cl. ...................... 242/343; 242/345.2
[58] Field of Search ............. 242/197, 198, 199, 200; 360/132, 130.21; 206/387, 389

[56] References Cited

U.S. PATENT DOCUMENTS

| | | | |
|---|---|---|---|
| 4,341,365 | 7/1982 | Oishi ........................ | 242/199 |
| 4,638,393 | 1/1987 | Oishi et al. ................ | 242/198 X |
| 4,887,775 | 12/1989 | Kanaguchi et al. ......... | 242/199 X |
| 5,219,130 | 6/1993 | Boshek ....................... | 242/199 |

FOREIGN PATENT DOCUMENTS

| | | | |
|---|---|---|---|
| 0152693 | 8/1985 | European Pat. Off. ............ | 242/199 |
| 2089765 | 6/1982 | United Kingdom ................ | 242/199 |
| 2099399 | 12/1982 | United Kingdom . | |
| 2104872 | 3/1983 | United Kingdom ................ | 242/199 |

Primary Examiner—Daniel P. Stodola
Assistant Examiner—John P. Darling
Attorney, Agent, or Firm—Lewis H. Eslinger; Jay H. Maioli

[57] ABSTRACT

A tape cassette includes supply reel and a takeup reel each with a plurality of notches arranged along the entire outer circumference of the lower flange of the reel. A plurality of projections are provided on a lower housing of the cassette for engaging the plurality of notches, and a resilient member is provided in an upper housing of the cassette for biasing the supply reel and the takeup reel toward the lower housing, causing the notches to engage the projections to form a lock for preventing rotation of the reels when the tape cassette is not in use.

12 Claims, 4 Drawing Sheets 5,356,089

REEL LOCK FOR VIDEO CASSETTE

This is a continuation of application Ser. No. 07/545,574, filed Jun. 29, 1990, now abandoned.

BACKGROUND OF THE INVENTION

1. Field of the Invention

This invention relates generally to a tape cassette for use with, for example, a video tape and video tape player and/or recorder and, more particularly, to a mechanism for locking the reels of tape to prevent movement when the cassette is not in use.

2. Description of the Background

In a tape cassette for use with, for example, a video tape and a video tape player and/or recorder, a reel lock mechanism is usually provided in order to prevent slack in the tape while the cassette is not being used.

FIG. 1 shows a conventional reel lock mechanism in a tape cassette. In FIG. 1, a flange portion 52 is attached to an upper surface of a reel body 51 to form the reel, and tape 55 is wound on the reel. A plurality of notches 53 are arranged at uniform intervals along the entire outer periphery of a flange forming the reel body 51. A lower housing (not shown) of the tape cassette pivotally supports a brake lever 54. When the cassette is not in use, that is, when the tape player and/or recorder is not activated, the brake lever 54 is biased in the direction of arrow A by a spring (not shown). An end of the brake lever 54 engages one of the notches 53 and locks the reel in place to prevent rotation. When the tape player and/or recorder is activated and the cassette is in use, the brake lever 54 is rotated in the direction of arrow B against the force of the spring. As a result, the end of the brake lever 54 is released from engagement with notch 53, thereby releasing the reel lock.

The prior art reel lock mechanism requires that the brake lever 54, the spring, and a support member be provided on the lower housing of the cassette to pivotally support the brake lever 54. This necessarily increases the number of parts required in the cassette and consequently increases the manufacturing cost. Additionally, the manufacturing process, particularly the assembly of the spring, cannot easily be automated, thus the speed of the assembly process is significantly lowered.

OBJECTS AND SUMMARY OF THE INVENTION

Therefore, it is an object of the present invention to provide an improved tape cassette that comprises a minimal number of parts, reduces manufacturing costs, increases the speed of assembly, and ensures a reliable reel lock.

According to an aspect of the present invention, a tape cassette comprises a plurality of notches arranged along the entire outer periphery of the flanges forming a supply reel and a takeup reel, projections provided in the lower housing of a cassette for engaging the plurality of notches, and a resilient member provided in the upper housing of a cassette for biasing the supply reel and the takeup reel toward a corresponding pair of reel bases provided in the tape player and/or recorder.

The reel lock mechanism of the present invention is formed simply by providing the notches along the outer circumferences of the flanges forming the reels, arranging the projections on a bottom surface of the lower housing of the cassette, and mounting the reel spring to the upper housing of the cassette, thereby reducing the number of parts, speeding up the assembly, and reducing the cost of manufacture.

Further, by providing projections on the lower surface of the upper housing of the cassette, the vertical distance that the supply reel and the takeup reel may freely move is limited, even when the tape cassette is intensively vibrated in a vertical direction. The projections in the upper housing thereby prevent the reels from lifting up and causing the notches to disengage from the projections in the lower housing, ensuring a reliable reel lock.

The above and other objects, features, and advantages of the present invention will become readily apparent from the following detailed description of preferred embodiments when read in conjunction with the accompanying drawings, in which like reference numerals are used to identify the same or similar parts in the several views.

DETAILED DESCRIPTION OF PREFERRED EMBODIMENTS

Figure 2:
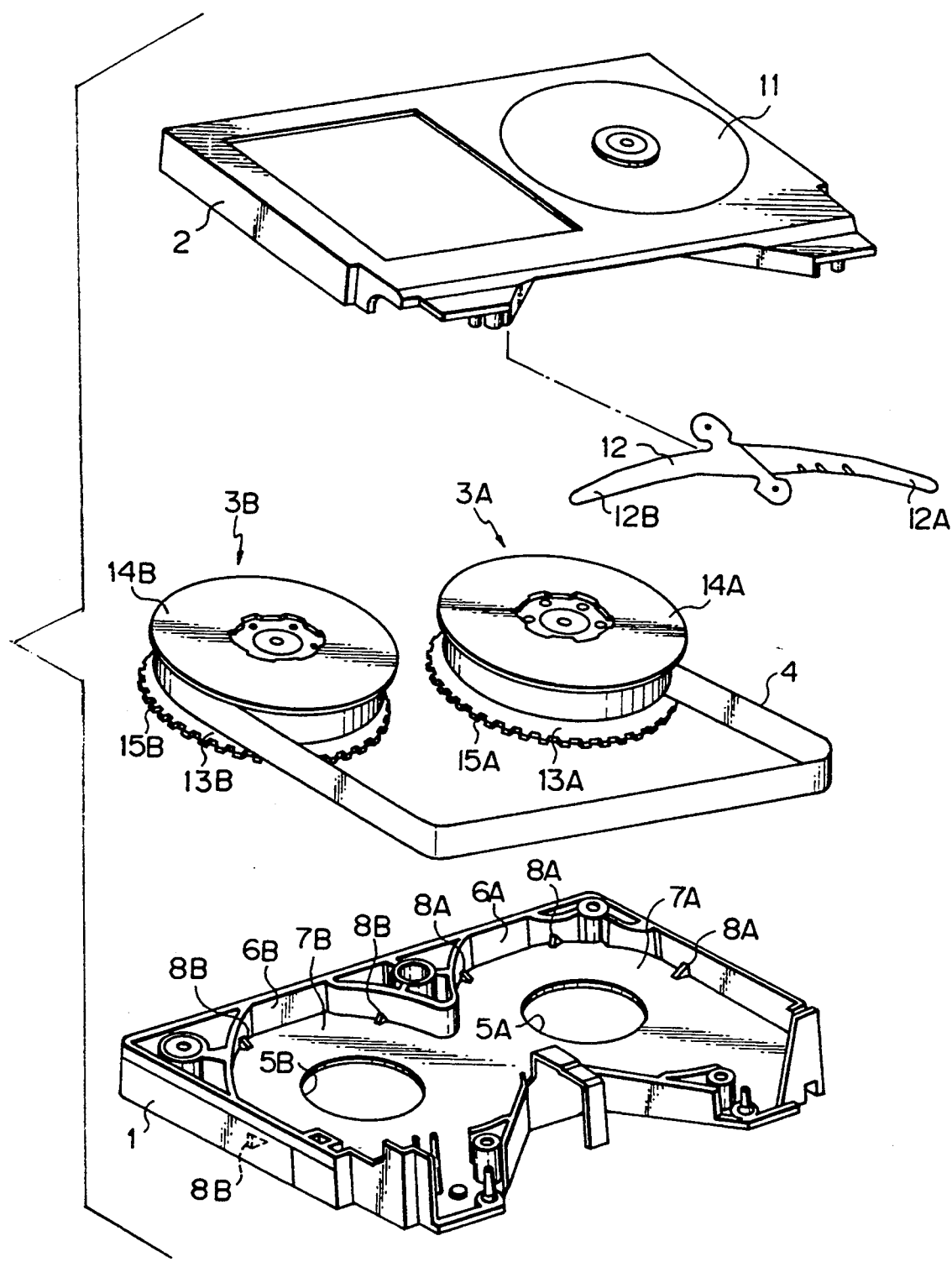
FIG. 2 is an exploded perspective view of a reel lock mechanism according to an embodiment of the present invention.

FIG. 2 is an exploded perspective view showing the structure of a reel lock mechanism according to an embodiment of the present invention. FIG. 2 shows the lower housing 1 of the cassette and the upper housing 2 of the cassette. The lower housing 1 and the upper housing 2 form an outer housing of the tape cassette that contains a supply reel 3A and a takeup reel 3B. A tape 4 is wound on the supply reel 3A and the takeup reel 3B.

On the bottom surface of the lower housing 1 are formed reel base insertion holes 5A and 5B. As shown in FIGS. 5B and 6B, reel bases 16A and 16B enter the cassette through insertions holes 5A and 5B to respectively engage and rotate reels 3A and 3B in order to drive the tape 4 through the player and/or recorder.

Peripheral walls 6A and 6B, formed within the lower housing 1, create annular portions 7A and 7B which encircle reel base insertion holes 5A and 5B and define spaces for enclosing the supply reel 3A and the takeup reel 3B, respectively. Along the bottom surface of lower housing 1, where the annular portions 7A and 7B join with the peripheral walls 6A and 6B, at least one of each of projections 8A and 8B are formed. In FIG. 2, three projections 8A and three projections 8B are provided along peripheral walls 6A and 6B where they meet annular portions 7A and 7B. The projections 8A and 8B may be located at any desired positions that correspond to the outer circumferences of the flanges forming reel bodies 13A and 13B.

Figure 1:
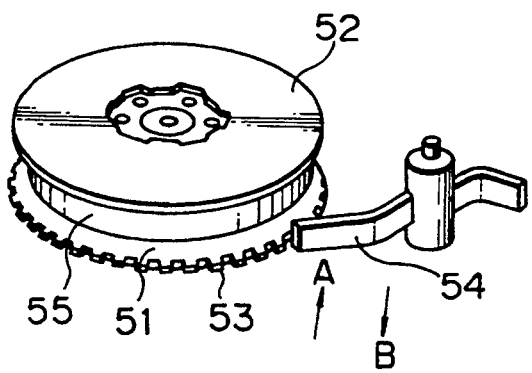
FIG. 1 is a perspective view of a conventional reel lock mechanism, useful in explaining a fundamental construction of a prior art reel lock mechanism.
Figure 3:
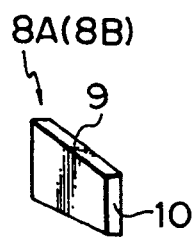
FIG. 3 is a perspective view of an embodiment of a projection used in the reel lock mechanism of the present invention.
Figure 4:
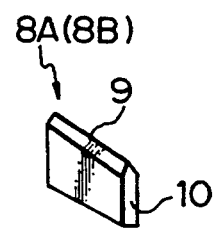
FIG. 4 is a perspective view of another embodiment of a projection used in the reel lock mechanism of the present invention.

The projections 8A and 8B are tapered at their upper surfaces 9 as shown in FIG. 3, and their side surfaces 10 have engagement portions for engaging with notches 15A and 15B along the outer circumferences of reel bodies 13A and 13B. The tapered upper surfaces 9 of the projections 8A and 8B facilitate the engagement of the projections with the notches 15A and 15B of the reel bodies 13A and 13B. As shown in FIG. 4, the upper surfaces 9 of the projections 8A and 8B may also be formed to peak at their centers to further facilitate the engagement of the notches with the projections when the reels are urged toward the lower housing 1 by the reel spring, as will be described below.

The upper housing 2 has a window 11 formed of, for example, transparent resin to permit visual access therethrough to view the tape 4 within the cassette. Within the upper housing 2 is mounted a bow-shaped reel spring 12 made of a highly resilient metal. Opposite ends 12A and 12B of the reel spring 12 are disposed to contact the centers of the reels 3A and 3B, respectively.

The supply reel 3A and the takeup reel 3B are made by attaching flange portions 14A and 14B to reel bodies 13A and 13B. Notches 15A and 15B are uniformly arranged along the entire outer peripheries of the flanges that form reel bodies 13A and 13B.

Figure 5A:
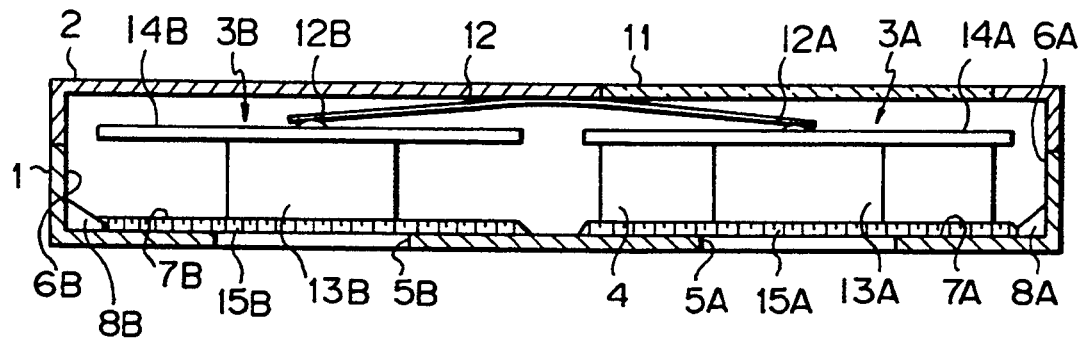
FIGS. 5A and 5B are cross-sectional views of a reel lock mechanism according to an embodiment of the present invention.
Figure 5B:
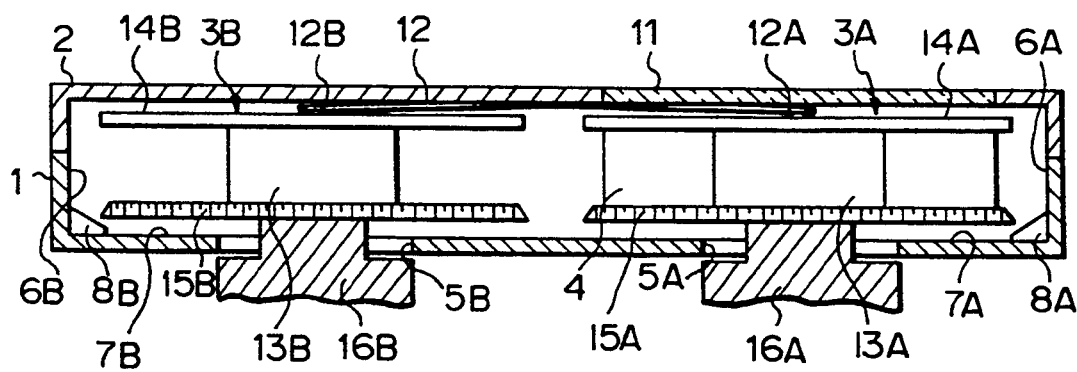

FIGS. 5A and 5B are cross-sectional views of an embodiment of the present invention. FIG. 5A shows the reel lock mechanism when the cassette is not in use, that is, when the player and/or recorder is not activated, and FIG. 5B shows the reel lock mechanism when the player and/or recorder is activated.

In FIG. 5A, the supply reel 3A and the takeup reel 3B are urged to the bottom surface of the lower housing 1 by the resilient force of the reel spring 12. The notches 15A and 15B along the outer circumferences of the reel bodies 13A and 13B are forced to engage the projections 8A and 8B of the lower housing 1. As a result, the supply reel 3A and the takeup reel 3B are locked to prevent rotation.

When the cassette is in use as shown in FIG. 5B, reel bases 16A and 16B, forming part of a cassette player and/or recording device (not shown), are inserted through the reel base insertion holes 5A and 5B when the player and/or recording device is activated and respectively engage the supply reel 3A and the takeup reel 3B. As a result, the supply reel 3A and the takeup reel 3B are lifted up from the bottom surface of the lower housing 1 against the force of the spring 12, disengaging notches 15A and 15B from the projections 8A and 8B. Thus, the supply reel 3A and the takeup reel 3B are able to rotate freely.

In the embodiment of the invention as described, a tape lock mechanism is established merely by providing notches 15A and 15B along the outer circumferences of the flanges forming reel bodies 13A and 13B, arranging projections 8A and 8B along the bottom surface of the lower housing 1, and attaching the reel spring 12 to the upper housing 2. The notches 15A and 15B located along the outer circumferences of the reel bodies 13A and 13B may be made in the same form as those of the conventional tape cassette, and no change is required in their design or the mold therefore.

Figure 6A:
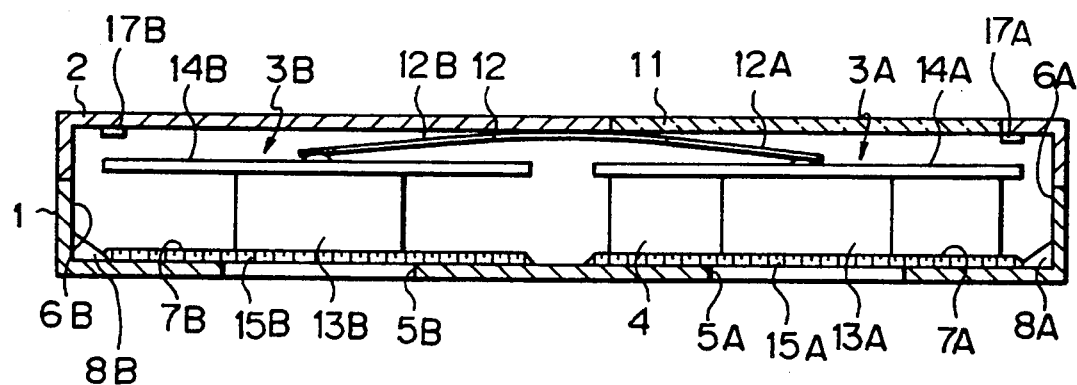
FIGS. 6A and 6B are cross-sectional views of a reel lock mechanism according to another embodiment of the present invention.
Figure 6B:
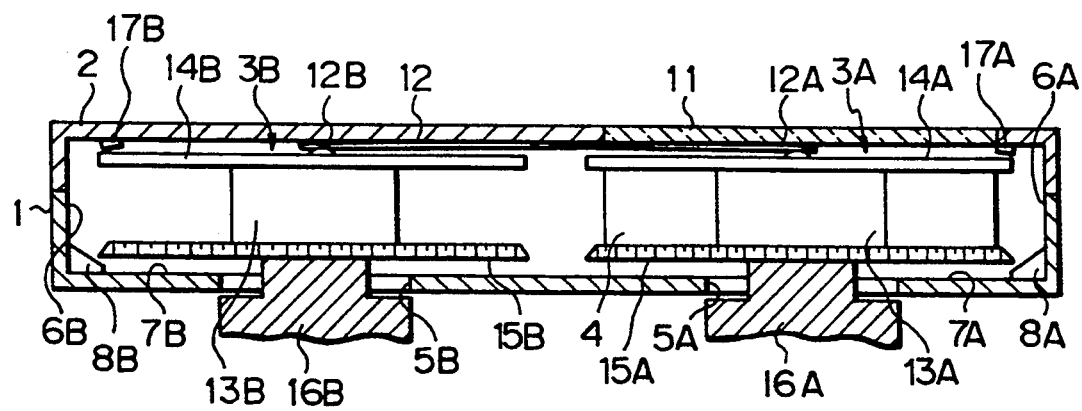

FIGS. 6A and 6B show another embodiment of the present invention which prevents accidental release of the reel lock upon intensive vertical vibrations of the tape cassette.

More specifically, FIG. 6A shows the reel lock mechanism when the tape cassette is not in use, and FIG. 6B shows the reel lock mechanism during use of the tape cassette. In this embodiment, upper projections 17A and 17B are provided within the upper housing 2. As shown in FIG. 6B, the upper projections 17A and 17B extend into the tape cassette housing a distance that would allow the reel bases 16A and 16B to lift reels 3A and 3B from the locked position but limit the vertical distance that the supply reel 3A and the takeup reel 3B can move. Thus, excessive vertical vibrations of the tape cassette will not cause the notches 15A and 15B to accidentally disengage from the projections 8A and 8B and will not accidentally release the lock.

Figure 7:
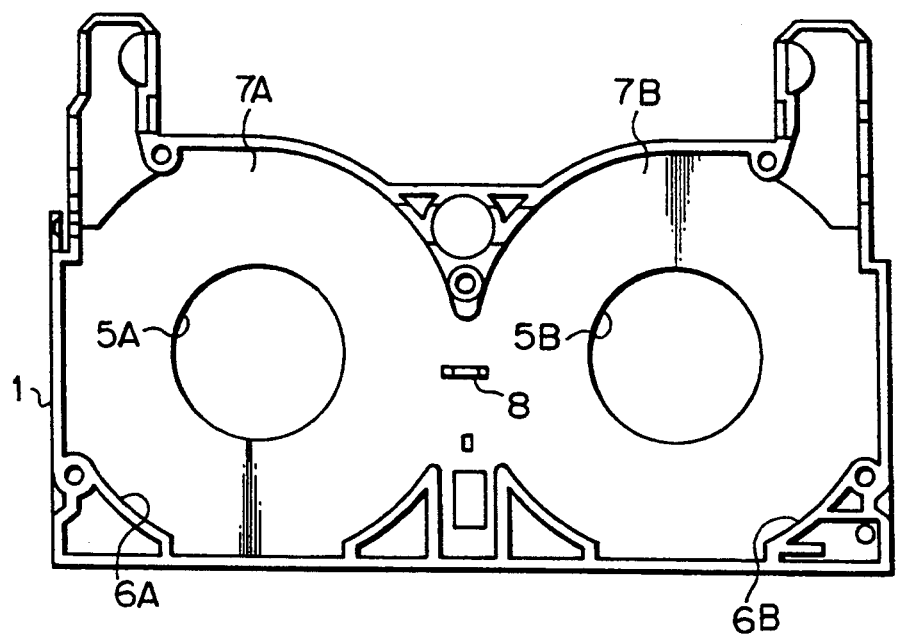
FIG. 7 is a plan view of the lower housing of a reel lock mechanism according to still another embodiment of the present invention.

Each of the above embodiments of the present invention use separate projections 8A and 8B corresponding to the supply reel 3A and the takeup reel 3B, respectively. In contrast, FIG. 7 shows still another embodiment of the present invention for use in an 8 mm VTR tape cassette, for example. In small-scaled tape cassettes such as those for 8 mm VTR, a single projection 8 for common use by the supply reel 3A and the takeup reel 3B may be provided at a position where their annular portions 7A and 7B join, thereby further reducing the number of parts needed to manufacture and assemble the reel lock mechanism.

Thus, according to the present invention, a reel lock mechanism is established by merely providing notches 15A and 15B along the outer circumferences of reel bodies 13A and 13B, providing the projections 8A and 8B on the bottom surface of a lower housing 1, and attaching a reel spring 12 to an upper housing 2. The number of parts is thereby reduced, the assembly process is accelerated and the manufacturing cost is decreased. The notches 15A and 15B along the outer circumferences of the reel bodies 13A and 13B may be the same as those of the conventional tape cassette, that is, no change is required in the design and mold of the reel bodies.

Additionally, by providing projections 17A and 17B inside the upper housing 2, the vertical distance that the supply reel 3A and the takeup reel 3B may move is limited, ensuring a reliable reel lock even upon intensive vertical vibrations of the tape cassette.

Having described preferred embodiments of the invention in detail with reference to the accompanying drawings, it is to be understood that the invention is not limited to those precise embodiments and that many changes and modifications could be effected by one with skill in the art without departing from the spirit and scope of the invention as defined in the appended claims.

What is claimed is:
1. A tape cassette comprising:
   a supply reel and a takeup reel;
   a lower housing having a bottom plate and peripheral walls joined thereto for surrounding annular portions in said bottom plate for respectively enclosing said supply reel and said takeup reel;
   an upper housing;
   said supply reel and takeup reel each being formed with a respective first plurality of notches uniformly arranged facing radially outwardly along the entire outer periphery of a flange forming said reel;

a second plurality of lower projections substantially less in number than said first plurality of notches and being formed on said annular portions at boundaries where said peripheral walls join said bottom plate of said lower housing of said tape cassette for engaging some of said first plurality of notches, wherein an upper surface of each of said lower projections includes two slanted surfaces to form a peak at its center and said two slanted surfaces are sloping downwardly from said peripheral walls toward said bottom plate; and an elongated resilient member located in said upper housing of said tape cassette, one end of said resilient member disposed to contact said supply reel and another end of said resilient member disposed to contact said takeup reel, whereby said resilient member biases said supply reel and said takeup reel toward said lower housing of said tape cassette so that less than all of said first plurality of notches engage said peaks formed respectively on said second plurality of lower projections.

2. A tape cassette according to claim 1, wherein said second plurality of projections are located on a portion of said lower housing that corresponds to said outer circumference of said flange of said supply reel and at least one of said lower projections is located on a portion of said lower housing that corresponds to said outer circumference of said flange of said takeup reel.

3. A tape cassette according to claim 1, wherein said elongated resilient member is bow-shaped.

4. A tape cassette according to claim 1, wherein the ends of said elongated resilient member are tapered.

5. A tape cassette according to claim 1, further comprising upper projections in said upper housing extending toward said supply reel and said takeup reel a distance for limiting vertical movement of said supply reel and said takeup reel within said tape cassette while allowing said reels to be lifted away from said lower projections to freely rotate.

6. A tape cassette comprising:
a supply reel and a takeup reel;
a lower housing having a bottom plate and peripheral walls joined thereto for surrounding annular portions therein for respectively enclosing said supply reel and said takeup reel, said peripheral walls having a mutual opening at a location where said annular portions meet;
an upper housing;
said supply reel and takeup reel each being formed with a respective plurality of notches uniformly arranged facing radially outwardly along the entire outer periphery of a flange forming said reel;
a single lower projection located in said mutual opening in said peripheral walls of said lower housing of said tape cassette midway between said supply reel and takeup reel where said annular portions meet for engaging one of said plurality of notches on both of said supply and takeup reels, wherein an upper portion of said lower projection includes two slanted surfaces to form a peak along a centerline thereof and said two slanted surfaces slope downwardly from said peripheral walls toward said bottom plate; and
an elongated resilient member located in said upper housing of said tape cassette, one end of said resilient member disposed to contact said supply reel and another end of said resilient member disposed to contact said takeup reel, whereby said resilient member biases said supply reel and said takeup reel toward said lower housing of said tape cassette so that said notches on both said supply and takeup reels engage said two slanted surfaces of said single lower projection.

7. A tape cassette according to claim 6, further comprising upper projections in said upper housing extending toward said supply reel and said takeup reel a distance for limiting vertical movement of said supply reel and said takeup reel within said tape cassette while allowing said reels to be lifted away from said lower projections to freely rotate.

8. A tape cassette according to claim 6, wherein said elongated resilient member is bow-shaped.

9. A tape cassette according to claim 6, wherein the ends of said elongated resilient member are tapered.

10. A tape cassette comprising:
a supply reel and a takeup reel;
a lower housing having a bottom plate and peripheral walls joined thereto for surrounding annular portions in said bottom plate for respectively enclosing said supply reel and said takeup reel;
an upper housing;
said supply reel and takeup reel each having substantially flat upper and lower flanges, each of said flanges being formed with a respective first plurality of notches uniformly arranged facing radially outwardly along the entire outer periphery thereof;
a second plurality of lower projections substantially less in number than said first plurality of said notches and being formed on said annular portions at boundaries where said peripheral walls join said bottom plate of said lower housing of said tape cassette for engaging some of said plurality of notches, wherein an upper portion of each of said lower projections includes two slanted surfaces to form a peak along a centerline thereof and said two slanted surfaces slope downwardly relative to the flat lower flanges of said supply and takeup reels from the peripheral walls toward the bottom plate of said lower housing; and
an elongated resilient member located in said upper housing of said tape cassette, one end of said resilient member disposed to contact said supply reel and another end of said resilient member disposed to contact said takeup reel, whereby said resilient member biases said supply reel and said takeup reel toward said lower housing of said tape cassette so that said notches engage said slanted upper surfaces of said lower projections.

11. A tape cassette according to claim 10, wherein said second plurality of projections are located on a portion of said lower housing that corresponds to said outer circumference of said flange of said supply reel and at least one of said lower projections is located on a portion of said lower housing that corresponds to said outer circumference of said flange of said takeup reel.

12. A tape cassette according to claim 10, further comprising upper projections in said upper housing extending toward said supply reel and said takeup reel a distance for limiting vertical movement of said supply reel and said takeup reel within said tape cassette while allowing said reels to be lifted away from said lower projections to freely rotate.

* * * * *